(12) United States Patent
Reddy et al.

(10) Patent No.: US 9,071,470 B2
(45) Date of Patent: Jun. 30, 2015

(54) LOW-COMPLEXITY DIGITAL RADIO INTERFACE

(75) Inventors: Madhukar Reddy, Carlsbad, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 811 days.

(21) Appl. No.: 12/418,489

(22) Filed: Apr. 3, 2009

(65) Prior Publication Data

US 2009/0252264 A1 Oct. 8, 2009

Related U.S. Application Data

(60) Provisional application No. 61/042,413, filed on Apr. 4, 2008.

(51) Int. Cl.
*H04L 27/08* (2006.01)
*H04L 27/00* (2006.01)

(52) U.S. Cl.
CPC .................................. *H04L 27/0002* (2013.01)

(58) Field of Classification Search
None
See application file for complete search history.

(56) References Cited

U.S. PATENT DOCUMENTS

| 5,375,146 | A | * | 12/1994 | Chalmers | 375/350 |
|---|---|---|---|---|---|
| 5,587,583 | A | * | 12/1996 | Chin et al. | 250/332 |
| 5,828,955 | A | * | 10/1998 | Lipowski et al. | 455/324 |
| 5,923,651 | A | * | 7/1999 | Struhsaker | 370/342 |
| 6,510,188 | B1 | * | 1/2003 | Isaksen et al. | 375/345 |
| 7,076,227 | B1 | * | 7/2006 | Smith | 455/278.1 |
| 2003/0128303 | A1 | * | 7/2003 | Masuda | 348/731 |
| 2004/0184564 | A1 | * | 9/2004 | Chen et al. | 375/330 |
| 2007/0009232 | A1 | * | 1/2007 | Muraki et al. | 386/95 |
| 2007/0081617 | A1 | * | 4/2007 | Fudge | 375/350 |
| 2007/0116150 | A1 | * | 5/2007 | May et al. | 375/322 |

* cited by examiner

*Primary Examiner* — Shuwang Liu
*Assistant Examiner* — Gina McKie
(74) *Attorney, Agent, or Firm* — Kilpatrick Townsend & Stockton LLP

(57) ABSTRACT

A radio integrated circuit includes, in part, an analog front end block, an analog-to-digital converter responsive to the analog-front end block, a digital signal processor responsive to the analog-to-digital converter and adapted to generate in-phase and quadrature signals, and a serial communication interface configured to receive and transmit the in-phase and quadrature signals. The serial communication interface supplies a gain control signal to the analog front end block when a switch disposed in the radio integrated circuit is in a first position. When the switch is in a second position, a gain control block disposed in the radio integrated circuit receives a gain control signal from the analog-to-digital converter and supplies the gain control signal to the analog front end block. The digital signal processor may be configured to interleave the in-phase and quadrature signals.

13 Claims, 2 Drawing Sheets

US 9,071,470 B2

LOW-COMPLEXITY DIGITAL RADIO INTERFACE

CROSS-REFERENCES TO RELATED APPLICATIONS

The present application claims benefit under 35 USC 119 (e) of U.S. provisional application No. 61/042,413, filed Apr. 4, 2008, entitled "Scheme for Low-Complexity Digital Radio Interfaces," the content of which is incorporated herein by reference in its entirety.

BACKGROUND OF THE INVENTION

The present invention relates to electronic circuits, and in particular, to a digital interface for radio receiver integrated circuits.

Conventionally, a radio receiver integrated circuit (radio IC) uses an analog interface to communicate with a demodulator integrated circuit. The radio IC delivers one or more analog intermediate frequency (IF) signals or analog baseband in-phase/quadrature (I/Q) signals to the demodulator IC and receives an analog automatic gain control (AGC) signal from the demodulator.

FIG. 1 is a block diagram of a conventional radio IC (hereinafter alternatively referred to as radio) 10 in communication with a demodulator IC (hereinafter alternatively referred to as demodulator) 50, as known in the prior art. Radio 10 is shown as including an analog front end 12 and an analog circuit block 14 adapted to generate signal B that is either an analog intermediate frequency (IF) signal or an analog baseband in-phase/quadrature (I/Q) signal. Demodulator 30 is shown as including an analog-to-digital converter (ADC) 16, a digital baseband modem 18, and a digital-to-analog converter 20. Signal B is converted from analog to digital by ADC 16 and then delivered to digital baseband modem 18. Output signal D of baseband modem 18 is subsequently converted from digital to analog and then delivered to analog front end (AFE) 14 to set the gain of AFE 14.

The analog signals that pass between the radio 10 and demodulator 10 are subject to degradation from interference. Furthermore, a high-performance ADC is a complex mixed digital-analog circuit that is difficult to design. Demodulator 20 is typically formed using advanced technology processes. Therefore, forming ADC 16 in demodulator 30 poses a significant technology development barrier.

BRIEF SUMMARY OF THE INVENTION

A radio integrated circuit includes, in part, an analog front end block, an analog-to-digital converter responsive to the analog-front end block, a digital signal processor responsive to said analog-to-digital converter and adapted to generate in-phase and quadrature signals, and a serial communication interface configured to receive and transmit the in-phase and quadrature signals.

In one embodiment, the serial interface is configured to receive a first gain control signal and supply the first gain control signal to the analog front end block when a switch disposed in the radio integrated circuit is in a first position. In one embodiment, the radio integrated circuit further includes, in part, a gain control block adapted to receive a second gain control signal from the analog-to-digital converter and to supply the second gain control signal to the analog front end block when the switch is in the second position. In one embodiment, the digital signal processor is further configured to interleave the in-phase and quadrature signals.

In one embodiment, the serial communication interface includes, at least a pair of signal lines. The first signal line of the pair carries a first subset of the bits associated with the in-phase and quadrature signals. The second line of the pair carries a second subset of the bits associated with the in-phase and quadrature signals. The first and second subsets represent the entire set of bits associated with the in-phase and quadrature signals. In one embodiment, the digital signal processor is further configured to insert synchronization bits between bits of the interleave in-phase and quadrature signals.

A method of processing communication signals, in accordance with one embodiment of the present invention includes, in part, amplifying a received analog signal, converting the amplified signal to a digital signal, processing the digital signal to generate in-phase and quadrature signals, and transmitting the in-phase and quadrature signals via at least one serial communication line.

The method of processing data, in accordance with some embodiments of the present invention further includes, receiving a first gain control signal via the serial communication line, and varying an amplification level of the analog signal in accordance with the first gain control signal when a switch is in a first position.

The method of processing data, in accordance with some embodiments of the present invention further includes, varying an amplification level of the analog signal in accordance with the second gain control signal when the switch is in a second position. The second gain control signal represents an output signal of the amplifier amplifying the received analog signal. In some embodiments, the in-phase and quadrature signals are transmitted via first and second communication lines, with the first communication line carrying a first subset of the bits associated with the in-phase and quadrature signals, and the second communication line carrying a second subset of the bits associated with the in-phase and quadrature signals. The first and second subsets represent an entire set of bits associated with the in-phase and quadrature signals. In one embodiment, synchronization bits are inserted between various bits of the interleave in-phase and quadrature signals.

DETAILED DESCRIPTION OF THE INVENTION

Figure 1:
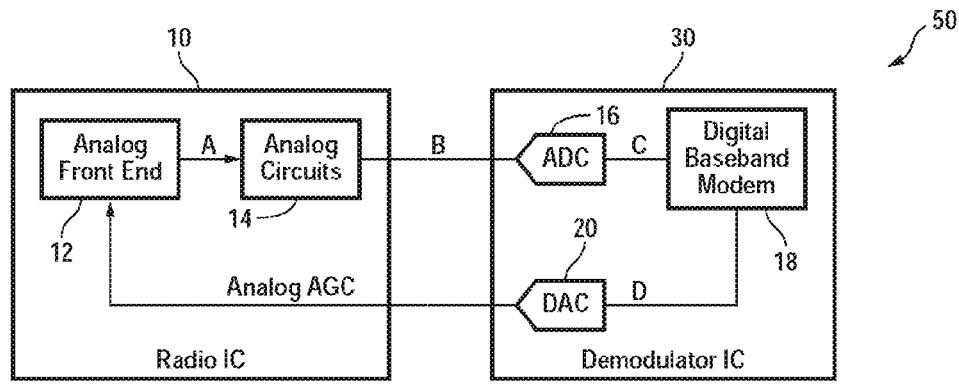
FIG. 1 is a block diagram of a conventional radio IC in communication with a demodulator IC, as known in the prior art.
Figure 2:
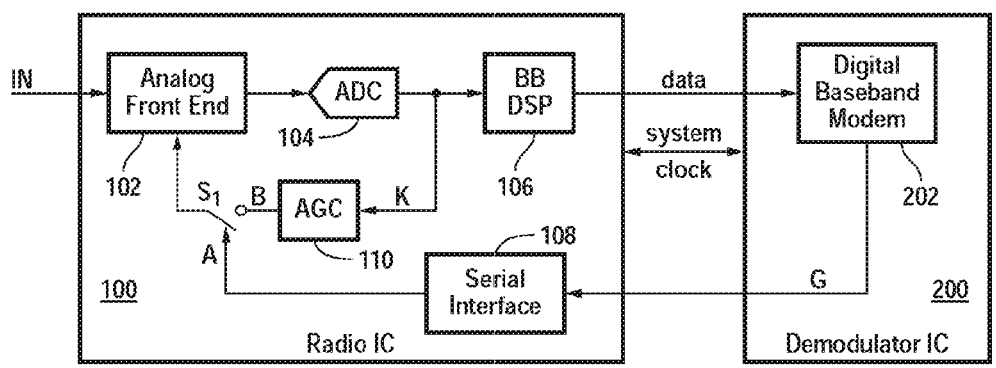
FIG. 2 is a block diagram of a radio IC in communication with a demodulator IC, in accordance with one embodiment of the present invention.

FIG. 2 is a block diagram of a radio IC (hereinafter alternatively referred to as radio or tuner) 100 in communication with a demodulator IC (hereinafter alternatively referred to as demodulator) 200, in accordance with one embodiment of the present invention. Radio 100 is shown as including, in part, an analog front-end block (AFE) 102, an analog-to-digital converter (ADC) 104, a base-band (BB) digital signal processor (DSP) 106, a serial interface 108, and an automatic gain control (AGC) block 110. AFE 102 is adapted to perform such functions as amplifying the received input signal IN. ADC 104 is adapted to convert the analog signal it receives from AFE 102 to a digital signal. Base-band DSP 106 is adapted to perform such operations as filtering, decimation, calibration functions such as I/Q mismatch and DC offset removal, as well as gain adjustment and signal strength estimation. AGC 110 is adapted to control the gain of AFE 102. Serial interface 108 is adapted to receive gain control signal G from demodulator 200 and supply this signal to AFE 102.

Tuner 100 and demodulator 220 have a digital interface and, accordingly, all the ports that are used to pass control and data between them carry digital signals. In one embodiment, the interface includes one data line carrying the digital I/Q signals supplied by radio tuner 100 to demodulator 200 and a clock signal that is shared by and common to tuner 100 and demodulator 200. The data line carries encoded bit stream of I and Q baseband data at a relatively low clock rate. The bit rate of the data line is equal to an integer multiple N of a shared clock signal having a period of T. In one embodiment, N is equal to 2. The shared clock, which may be a single ended signal in some embodiments, provides both frequency synchronization and an edge reference for the purpose of retiming the data on the demodulator.

The gain of AFE 100 may be varied according to any one of the following embodiments. In accordance with one embodiment, demodulator 200 sends a gain control signal G via a serial communication line to serial interface 108 disposed in tuner 100. Such serial communication may conform to I²C standard commonly used in the industry. Switch S is positioned in the A position to apply gain signal G to AFE 102. In accordance with another embodiment, AGC 110 receives signal K from ADC 104 and, in response, applies a corresponding gain control signal to AFE 102 when switch S1 is in the B position. AGC 110 is adapted to implement any desired gain control algorithm, such as the well-known PID controller algorithm.

Data is supplied serially with alternating I/Q words on the data line. In one exemplary embodiment, shown in FIG. 3A, 159 bits of payload together with one synchronization bit is transmitted. The payload includes five pairs of I and Q samples with each sample including, in turn, 16 bits excluding the least significant bit of the last Q sample. The samples are in signed 2's complement format, as shown in Table I, representing 4-bit 2's complement integer, and Table II, representing 8-bit 2's complement integer with sign extension.

TABLE I

| Sign Bit | | | | Decimal |
|---|---|---|---|---|
| 0 | 1 | 1 | 1 | 7 |
| 0 | 1 | 1 | 0 | 6 |
| 0 | 1 | 0 | 1 | 5 |
| 0 | 1 | 0 | 0 | 4 |
| 0 | 0 | 1 | 1 | 3 |
| 0 | 0 | 1 | 0 | 2 |
| 0 | 0 | 0 | 1 | 1 |
| 0 | 0 | 0 | 0 | 0 |
| 1 | 1 | 1 | 1 | −1 |
| 1 | 1 | 1 | 0 | −2 |
| 1 | 1 | 0 | 1 | −3 |
| 1 | 1 | 0 | 0 | −4 |
| 1 | 0 | 1 | 1 | −5 |
| 1 | 0 | 1 | 0 | −6 |
| 1 | 0 | 0 | 1 | −7 |
| 1 | 0 | 0 | 0 | −8 |

TABLE II

| Sign Bit | | | | | | | | Decimal |
|---|---|---|---|---|---|---|---|---|
| 0 | 0 | 0 | 0 | 0 | 1 | 1 | 1 | 7 |
| 0 | 0 | 0 | 0 | 0 | 1 | 1 | 0 | 6 |
| 0 | 0 | 0 | 0 | 0 | 1 | 0 | 1 | 5 |
| 0 | 0 | 0 | 0 | 0 | 1 | 0 | 0 | 4 |
| 0 | 0 | 0 | 0 | 0 | 0 | 1 | 1 | 3 |
| 0 | 0 | 0 | 0 | 0 | 0 | 1 | 0 | 2 |
| 0 | 0 | 0 | 0 | 0 | 0 | 0 | 1 | 1 |
| 0 | 0 | 0 | 0 | 0 | 0 | 0 | 0 | 0 |
| 1 | 1 | 1 | 1 | 1 | 1 | 1 | 1 | −1 |
| 1 | 1 | 1 | 1 | 1 | 1 | 1 | 0 | −2 |
| 1 | 1 | 1 | 1 | 1 | 1 | 0 | 1 | −3 |
| 1 | 1 | 1 | 1 | 1 | 1 | 0 | 0 | −4 |
| 1 | 1 | 1 | 1 | 1 | 0 | 1 | 1 | −5 |
| 1 | 1 | 1 | 1 | 1 | 0 | 1 | 0 | −6 |
| 1 | 1 | 1 | 1 | 1 | 0 | 0 | 1 | −7 |
| 1 | 1 | 1 | 1 | 1 | 0 | 0 | 0 | −8 |

Figure 3A:
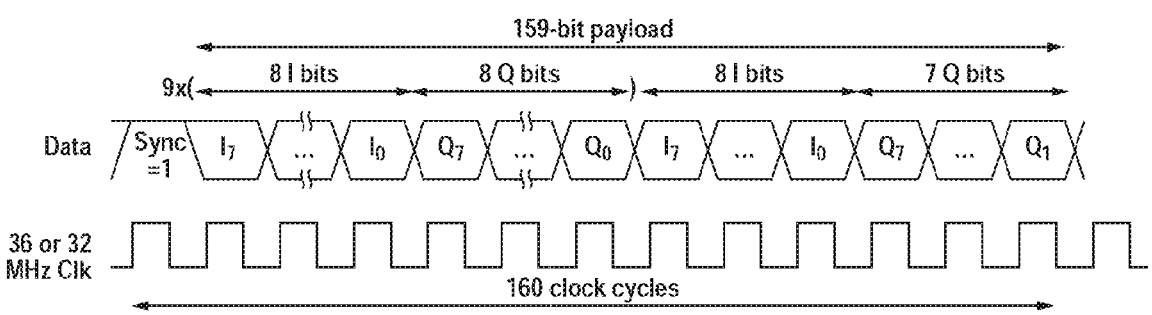
FIGS. 3A-3B show the interleaved in-phase and quadrature data delivered by the radio IC to the demodulator IC of FIG. 3 via a single interface line.
Figure 3B:
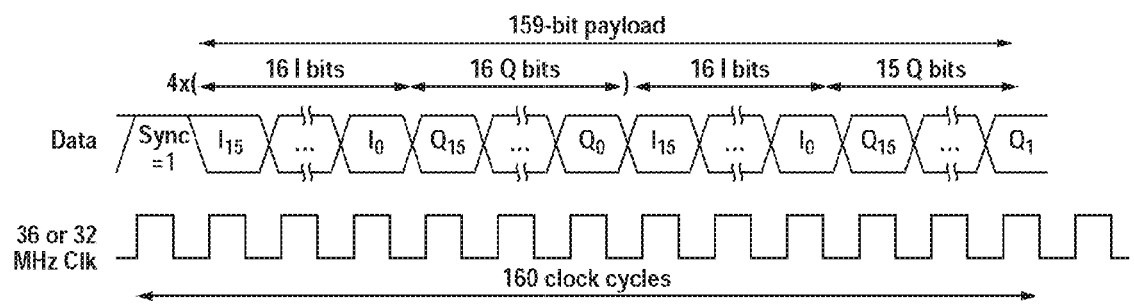

In another exemplary embodiment, shown in FIG. 3B, the 159 bits of payload includes ten pairs of I and Q samples of 8 bits each, excluding the least significant bit of the last Q sample. A synchronization bit is inserted before the payload bits thus forming a word having a length of 160 bits.

Figure 4:
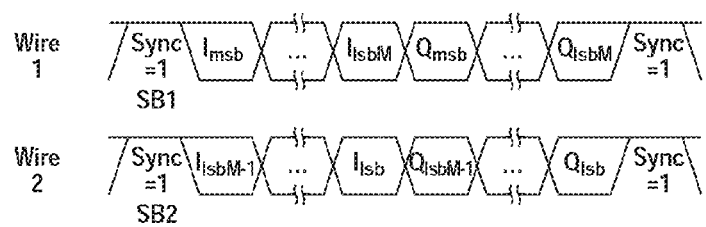
FIG. 4 shows the interleaved in-phase and quadrature data delivered by the radio IC to the demodulator IC of FIG. 3 via a pair of interface lines.

In one embodiment, the in-phase (I) and quadrature (Q) signals delivered by base-band DSP 106 are transmitted in an interleaved manner having boundaries demarked by synchronization bits SYNC, as shown in FIGS. 3A-3B. If the bit rate associated with transfer of I and Q signals is greater than N*T, additional signal lines are used. For example, in the example shown in FIG. 4, two exemplary signal lines (not shown) are used to carry the data. For example, if the number of bits associated with the I and Q signals is equal to J, then the most significant bits from J to J-M are transferred on the first signal line, while the remaining M−1 bits are transferred on the second signal line, as shown in FIG. 4. If additional payload capacity is available on, for example, signal line number 2 after accommodating the I and Q streams, then any desired auxiliary information may be inserted into I and Q payloads to use the remaining capacity. Synchronization bit SB2, shown on signal line number 2, is optional and may be omitted since synchronization SB1 is sufficient to provide I/Q word boundary synchronization.

Figure 5:
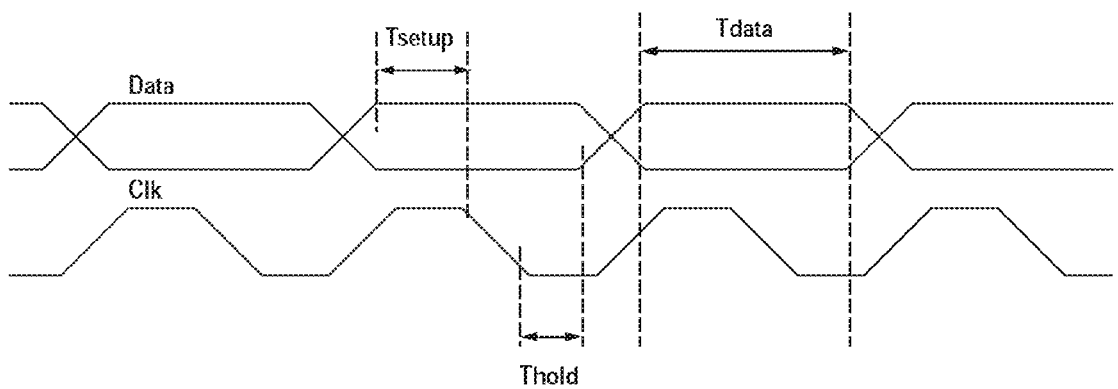
FIG. 5 shows the timing relationship between data and clock signals of FIG. 2, in accordance with one exemplary embodiment of the present invention.

The shared system clock provides a reference for retiming of the data at the demodulator. Referring to FIG. 5, the data bit can be sampled on the falling edge of the system clock to achieve bit synchronization. As described above, in accordance with the present invention, the available bandwidth is used to provide synchronization bits, thereby allowing rapid synchronization without requiring any handshaking.

The data words begin to appear on the data line after the radio IC is powered on. The demodulator IC can achieve synchronization as described in the following. The demodulator first issues a command to the radio IC through the serial interface 108. This causes the next two payload of the words to include only zero bits without affecting the present payload. The demodulator then resets the synchronization and correlates a word length over 4 words, locates the position of the only bit in the resulting correlation word which equals "1" and uses this to recover the relative position of the sync bit.

The above embodiments of the present invention are illustrative and not limitative. Various alternatives and equivalents are possible. The invention is not limited by the type of amplification, digital to analog conversion, digital signal processing, gain control, etc. The invention is not limited by the rate used to transfer the data. The invention is not limited by the type of integrated circuit in which the present disclosure may be disposed. Nor is the disclosure limited to any specific type of process technology, e.g., CMOS, Bipolar, or BIC-MOS that may be used to manufacture the present disclosure. Other additions, subtractions or modifications are obvious in view of the present disclosure and are intended to fall within the scope of the appended claims.

What is claimed is:

1. A tuner comprising:
an analog front end block;
an analog-to-digital converter responsive to the analog-front end block;
a digital signal processor responsive to said analog-to-digital converter and adapted to output in-phase and quadrature data via a first terminal, wherein said digital signal processor is further configured to interleave the in-phase and quadrature data, said first terminal carrying a first subset of bits associated with the in-phase and quadrature data;
a serial communication interface block receiving a first gain control signal via a second terminal, said serial communication interface block being further configured to supply the first gain control signal to the analog front end block when a switch is in a first position;
a gain control block adapted to receive a second gain control signal from the analog-to-digital converter and to supply the second gain control signal to the analog front end block when the switch is in a second position; and
a third terminal carrying a second subset of bits associated with the in-phase and quadrature signals, said first and second subsets representing an entire set of bits associated with the in-phase and quadrature data, wherein the first subset of bits associated with the in-phase and quadrature data is transmitted in a first data packet having a synchronization header, and the second subset of bits associated with the in-phase and quadrature data is transmitted in a second data packet, the first and second data packets sharing a same clock signal.

2. The tuner of claim 1 wherein said digital signal processor is further configured to insert synchronization bits between bits of the interleave in-phase and quadrature data.

3. The tuner of claim 1 wherein the in-phase and quadrature data are in a 2's complement form.

4. The tuner of claim 1 wherein the interleaved in-phase and quadrature data are transmitted in a data packet having a synchronization pattern.

5. The tuner of claim 4 wherein the synchronization pattern comprises a single bit.

6. The tuner of claim 1 wherein the second data packet carries auxiliary data in additional to the second subset of bits associated with the in-phase and quadrature data.

7. A method of processing communication signals, the method comprising:

amplifying a received analog signal;
converting the amplified analog signal to a digital signal;
processing the digital signal to generate in-phase and quadrature data;
transmitting the in-phase and quadrature data via a first terminal;
receiving a first gain control signal via a serial communication interface;
varying an amplitude of the analog signal in accordance with the first gain control signal when a switch is in a first position;
varying an amplification level of the analog signal in accordance with the second gain control signal when the switch is in a second position, said second gain control signal being representative of the converted digital signal;
transmitting a first subset of the in-phase and quadrature data via the first terminal; and
transmitting a second subset of the in-phase and quadrature data via a second terminal, said first and second subsets representing an entire set of bits associated with the in-phase and quadrature signals, wherein the first subset of the in-phase and quadrature data is transmitted in a first data packet having a synchronization pattern, and the second subset of the in-phase and quadrature data is transmitted in a second data packet, the first and second data packets sharing a same clock signal.

8. The method of claim 7 further comprising:
interleaving the in-phase and quadrature data.

9. The method of claim 8 further comprising:
inserting synchronization bits between bits of the interleaved in-phase and quadrature data.

10. The method of claim 7 further comprising:
receiving a command via the serial communication interface; and
setting a plurality of bits of the in-phase and quadrature data to a logical binary value in response to the received command.

11. The method of claim 7 wherein the in-phase and quadrature data are in a 2's complement form.

12. The method of claim 7 wherein the synchronization pattern comprises a single bit.

13. The method of claim 7 wherein the second data packet comprises auxiliary data in addition to the second subset of the in-phase and quadrature data.

* * * * *